(12) United States Patent
Ito et al.

(10) Patent No.: US 6,447,571 B1
(45) Date of Patent: Sep. 10, 2002

(54) METAL POWDER

(75) Inventors: Takayuki Ito, Chigasaki (JP); Hideo Takatori, Chigasaki (JP)

(73) Assignee: Toho Titanium Co., Ltd., Chigasaki (JP)

( * ) Notice: Subject to any disclaimer, the term of this patent is extended or adjusted under 35 U.S.C. 154(b) by 0 days.

(21) Appl. No.: 09/508,616

(22) PCT Filed: Jul. 13, 1999

(86) PCT No.: PCT/JP99/03781

§ 371 (c)(1),
(2), (4) Date: Mar. 24, 2000

(87) PCT Pub. No.: WO00/03823

PCT Pub. Date: Jan. 27, 2000

(30) Foreign Application Priority Data

Jul. 15, 1998 (JP) .................................. 10-200309

(51) Int. Cl.[7] .............................. B22F 1/00; B22F 1/02; C22C 1/04; C22C 19/03
(52) U.S. Cl. .............................. 75/255; 75/359; 75/369
(58) Field of Search .................. 75/255, 252, 359, 75/360, 369

(56) References Cited

U.S. PATENT DOCUMENTS

| 4,670,047 A | * | 6/1987 | Kopatz et al. ................. 75/5 B |
| 4,710,427 A | * | 12/1987 | Yamauchi et al. ........... 428/407 |
| 4,976,777 A | * | 12/1990 | Ozawa et al. .................. 75/255 |
| 5,316,577 A | * | 5/1994 | Wu .......................... 106/197.1 |
| 5,712,028 A | * | 1/1998 | Seki et al. ................... 428/216 |
| 5,853,451 A | * | 12/1998 | Ishikawa ...................... 75/367 |

FOREIGN PATENT DOCUMENTS

| JP | 61-014705 A | * | 1/1986 |

* cited by examiner

*Primary Examiner*—Roy King
*Assistant Examiner*—Harry D. Wilkins, III
(74) *Attorney, Agent, or Firm*—Oliff & Berridge, PLC

(57) ABSTRACT

The present invention provides a metallic powder which exhibits superior sintering properties in a production of multilayer ceramic capacitors, and exhibits superior dispersion characteristics in forming of conductive pastes, thereby preventing delamination. Metallic powder produced by bringing a metallic chloride gas into contact with a reducing gas in a reducing temperature range is subjected to a surface treatment by a nonionic surfactant in a wet or dry process to obtain final metallic powder.

12 Claims, 1 Drawing Sheet

METAL POWDER

TECHNICAL FIELD

The present invention relates to a metallic powder suitable for various uses, such as in electrical materials such as conductive pastes, bonding materials for titanium, and for catalysts, and in particular, the invention relates to a metallic powder having superior sintering properties and dispersion characteristics, which is specifically suitable for conductive pastes and internal electrodes in multilayer ceramic capacitors.

BACKGROUND ART

Noble metals such as silver, palladium, platinum, and gold, and base metals such as nickel, cobalt, iron, molybdenum, and tungsten have long been used for electrical materials such as conductive pastes, and have specifically been used for internal electrodes in multilayer ceramic capacitors. Multilayer ceramic capacitors generally have a construction such that ceramic dielectric layers and metallic layers used for internal electrodes are alternately laminated, and external electrodes, which are connected to the metallic layers, are connected to both ends of the ceramic dielectric layers. Materials having a high dielectric constant such as barium titanate, strontium titanate, and yttrium oxide, are used as primary components for forming the ceramic dielectric layers. Powders of the above noble metals and the base metals are used as metals forming internal electrodes. Less expensive electrical parts are recently required, and therefore research on multilayer ceramic capacitors using the latter base metallic powders has been aggressively pursued, and nickel powder is typical among these metals.

Multilayer ceramic capacitors are generally manufactured by the following method. That is, a dielectric powder, such as barium titanate, is mixed and suspended in an organic binder, and this is then formed into a sheet by using a doctor blade method so as to produce a dielectric green sheet. On the other hand, a metallic powder for internal electrodes is mixed with an organic compound such as an organic solvent, a plasticizer, or an organic binder so as to produce a metallic powder paste, and the paste is printed on the green sheet by using a screen printing method. This is then subjected to drying, laminating, firm pressing, and heating to remove the organic component, and is then sintered at about 130° C. or more. Then, external electrodes are burned to both ends of the ceramic dielectric layers, and a multilayer ceramic capacitor is thereby manufactured.

In manufacturing processes for multilayer ceramic capacitors such as the above, the volume of the metallic powder changes due to expansion and contraction thereof during the processing to vaporize and remove the organic component from the metallic paste and the subsequent process for sintering. Similarly, the volume of the dielectric body changes due to the sintering. That is, the different materials of the dielectric body and the metallic powder are simultaneously sintered, and it is therefore inevitable that sintering properties will differ due to changes in volumes due to expansion and contraction of these materials during sintering. As a result, the process has problems in that the laminate construction may be broken and crack or peeling called delamination may occur.

Specifically, sintering in a dielectric body comprising barium titanate as a primary component is initiated at 1000° C. or more, typically at a temperature in the range of 1200 to 1300° C. However, sintering in a metallic powder for internal electrodes is initiated at a lower temperature than this temperature, for example, normally at a temperature in the range of 400 to 500° C. in the case of nickel powder, and as a result, the volume changes due to extreme contraction, and the portion between the internal electrode and the dielectric sheet is strained. Thus, the difference between the initiation temperatures for sintering results in differences between sintering properties of the internal electrode and the dielectric body, and this is therefore a primary cause of delamination. Moreover, when sintering is suddenly initiated at low temperatures, volume change in the final period of the sintering is large, so that delamination readily occurs. Therefore, in metallic powders used for internal electrodes, it is desirable that the initiating temperature for sintering be as high as possible and that extreme sintering does not occur.

Heretofore, various methods for solving the problems of delamination have been proposed. For example, Japanese Patent Application, First Publication, No. 157903/96 discloses a method in which a spherical palladium powder having a predetermined diameter is heated at a temperature in the range of 100 to 200° C. in air for 24 hours or more, and a paste is then produced by using the palladium powder. Japanese Patent Application, First Publication, No. 176602/96 discloses a method in which a palladium powder is kneaded with an acid soluble salt, such as alkaline salts, and an organic solvent; then the organic solvent is vaporized and removed, and the mixture of the palladium powder and the acid soluble salt is heated to 300° C. or more, and is then cooled in air; and finally, the compound is dissolved so as to yield a palladium powder The above conventional methods can yield some improvements in improving sintering properties. However, these methods complicate processing and operations, and are not sufficient to effectively prevent delamination even though the methods consume large amounts of energy. On the other hand, internal electrodes are required to be formed in thin layers and to have low electrical resistance in accordance with the trends toward miniaturization and large capacity in capacitors, and therefore powders for internal electrodes are required to be super-fine powders, having not only diameters of 1$\mu$m or less, but also diameters of 0.5$\mu$m or less. When such a powder consisting of super-fine particles is mixed with an organic solvent, the dispersion characteristics of the powder is deteriorated and the metallic particles agglomerate with each other. As a result, thin layers in internal electrodes cannot be easily formed due to an increase in the number of coarse particles, and bumps and depressions formed on a surface of electrodes may cause short circuiting and also may result in delamination. Therefore, further improvements in dispersion characteristics of metallic powders in organic solvents to form conductive pastes are desired.

Furthermore, as mentioned above, multilayer ceramic capacitors with internal electrodes made from base metallic powders, typified by nickel, are researched according to the requirements for inexpensive electrical parts. However, at present, such metallic powders, which can inhibit delamination and are suitable for conductive pastes, have not yet been produced.

DISCLOSURE OF THE INVENTION

Therefore, an object of the invention is to provide a metallic powder, typified by inexpensive base metals such as nickel, in which superior sintering properties are exhibited during production processes for multilayer ceramic capacitors, and superior dispersion characteristics are exhibited in forming conductive pastes, thereby avoiding delamination. More specifically, the invention provides a metallic powder in which the initiation temperature for sintering is high compared to that of conventional metallic powders, and is near the sintering initiation temperature of dielectric bodies used in producing multilayer ceramic capacitors, so that delamination is inhibited.

The inventors have performed intensive research to achieve the above objects. As a result, they have made the invention based on knowledge that the desired powder can be produced by treating surfaces of metallic powders with a surfactant. That is, the invention provides a metallic powder in which the surface was treated with a surfactant. The metallic powders according to the invention are metals suitable for conductive pastes, and noble metals such as silver, palladium, platinum, and gold and the like, and base metals such as nickel, cobalt, iron molybdenum, and tungsten and the like can be applied thereto. Among these metals, the base metals are preferable since they are inexpensive, and specifically, nickel is further preferable.

Particle properties of the metallic powder of the present invention are not particularly limited as long as nothing interferes with their use in conductive pastes. However, according to the trends toward weight reduction and compact design of electronic products in recent years, the multilayer ceramic capacitors, as parts thereof, are required to be progressively miniaturized. Therefore, the particle size of metallic powder used for the internal electrodes used therein is required to be progressively smaller. Therefore, the metallic powder according to the present invention normally has an average particle size of $1 \mu m$ or less, and is preferably in the range of 0.01 to $1 \mu m$, more preferably consists of fine particles having an average particle size in the range of 0.05 to $0.5 \mu m$. The specific surface area of the metallic powder measured by the BET method is preferably 1 to 20 $m^2/g$. In addition, the particle shape of the metallic powder of the invention is preferably spherical in order to improve sintering properties and dispersion characteristics.

The metallic powder of the invention can be produced by well-known methods such as vapor phase methods and liquid phase methods. In particular, vapor phase reducing methods in which the metallic powder is formed by contacting a metallic chloride gas with a reducing gas is preferable method since the particle size of the metallic powder produced can be easily controlled and spherical particles can be efficiently produced. In the vapor phase reducing method, the vaporized metallic chloride gas reacts with reducing gas such as hydrogen. The metallic chloride gas can be generated by heating and vaporizing a solid metallic chloride. In consideration of avoiding oxidation of the metallic chloride and in view of energy efficiency, an advantageous production method is one in which a metallic chloride gas is continuously generated by contacting the desired metal with a chlorine gas, and the metallic chloride gas is directly supplied to a reduction process, thereby being brought into contact with a reducing gas and continuously reducing the metallic chloride powder.

During a process for production of metallic powder in a vapor phase reducing method, metallic atoms are formed instantaneously when a metallic chloride gas contacts a reducing gas, and ultrafine particles are formed and grow through collision and cohesion of atoms. The particle size of the formed metallic powder depends on conditions such as the partial pressure and the temperature of the metallic chloride gas in the reduction process. According to the above producing process for metallic powder, as a metallic chloride gas is generated in an amount according to the amount of chlorine gas supplied, the amount of metallic chloride gas which is supplied to the reduction process can be controlled by controlling the amount of chlorine gas supplied. Moreover, as the metallic chloride gas is generated by the reaction of the chlorine gas with the metal, the consumption of carrier gas can be reduced (and under production conditions, no carrier gas may be necessary) compared to methods in which a solid mass of metallic chloride is heated and vaporized to form a metallic chloride gas. Therefore, the consumption of carrier gas can be reduced, and accordingly, energy for heating can be reduced, so that production costs can be lowered.

The partial pressure of the metallic nickel chloride gas can be controlled in the reduction process by mixing an inert gas in the metallic chloride gas generated in the chlorination process. Thus, the particle size of the metallic powder can be controlled by controlling the amount of chlorine gas supplied or the partial pressure of the metallic chloride gas supplied in the reduction process, and therefore the particle size of the metallic powder can be stable and be optionally set.

The above-described production conditions of the metallic powder by a vapor phase reducing method cannot be absolutely specified; however, when a nickel powder is produced, metallic nickel as a starting raw material is preferably granular, in masses, or in plates having sizes of about 5 to 20 mm, and the purity thereof is preferably 99.5% or more. The metallic nickel is first reacted with chlorine gas so that a nickel chloride gas is generated. The reaction temperature is 800° C. or more and is less than the melting point of nickel, 1453° C., in order to continue the reaction sufficiently. In practice, the reaction temperature is preferably in the range of 900 to 1100° C. for commercial use, in consideration of the reaction rate and the service life of the chlorination furnace. Then, the nickel chloride gas is directly provided to a reduction process to be brought into contact with a reducing gas such as hydrogen gas. In this case, inert gas such as nitrogen, argon, etc., is mixed with the nickel chloride gas at 1 to 30 mole percents, and this gas mixture may be introduced into the reduction process. The temperature of the reducing reaction may be above the temperature at which the reaction progresses sufficiently to completion; however, the temperature is preferably less than the melting point of nickel, since handling is facilitated if a solid metallic powder is formed, and it is in practice in the range of 900 to 1100° C. in view of economic efficiency.

In this way, the nickel powder is produced by performing the reducing reaction, and the produced nickel powder is then cooled. During the cooling, it is desirable that gas flowing at near 1000° C. in the completed reducing reaction be cooled quickly to about 400 to 800° C. by blowing an inert gas such as a nitrogen gas, etc., and metallic powder having desired particle size can thereby be obtained by preventing the generation of secondary particles in which primary particles of the formed nickel cohere to each other. Thereafter, the formed nickel powder is separated and recovered by, for example, one or a combination of two or more means including a bag-filter, separation by collection in water or oil, and magnetic separation.

The invention is a metallic powder obtained by performing a surface treatment using a surfactant on a metallic powder produced by a process such as the above. As surfactants, it is possible to use one or more kinds selected from the group consisting of cationic surfactants, anionic surfactants, amphoteric surfactants, nonionic surfactants, and fluoric surfactants, and reactive surfactants.

Specifically, primary to tertiary aliphatic amine salts, aliphatic quarternary ammonium salts, benzalkonium salts, beizethonium chlorides, pyridinium salts, imidazolium salts, etc., may be mentioned as cationic surfactants. As anionic surfactants, fatty acid soaps; N- acylamino acids or salts thereof; carboxylates such as polyoxyethylene alkyl ether carboxylate; sulfonates such as alkylbenzene sulfonate, alkylnaphthalene sulfonate, dialkylsulfo succinic ester, sulfosuccinic dialkylate, and alkylsulfo acetate; sulfates such as sulfated oil, fatty alcohol sulfate, polyoxyethylene alkylether sulfate, polyoxyethylene alkylphenylether sulfate, and monoglysulfate; and phosphates such as polyoxyethylene alkyl ether phosphate, polyoxyethylene phenyl ether phosphate, and alkyl phosphate may be mentioned.

As amphoteric surfactants, carboxy betaine type, aminocarboxylate, inidadirinium betaine, lecithin, alkylamine oxide, etc. may be mentioned. As nonionic surfactants, ether types such as polyoxyethylene mono-or dialkyl ethers with carbon numbers in the alkyl group of 1 to 18, polyoxyethylene sec-alcohol ether, polyoxyethylene alkyl phenyl ether, polyoxyethylene sterol ether, and ethers such as polyoxyethylene lanolin derivative; ether esters such as polyoxyethylene glycerol fatty acid ester, polyoxyethylen castor oil, polyoxyethylene sorbitan fatty acid ester, polyoxyethylene sorbitol fatty acid ester, polyoxyethylene fatty acid alkanolamide sulfate; ester types such as polyethylene glycol fatty acid ester, ethylene glycol fatty acid ester, fatty acid monoglyceride, polyglyceryl fatty acid ester, sorbitan fatty acid ester, propylene glycol fatty acid ester, sucrose fatty acid ester; nitrogen-conlaining types such as fatty acid alkanolamide, polyoxyethylene fatty acid amide, and polyoxyethylene alkylamine, etc. may be mentioned.

As fluoric types of surfactants, fluoroalkyl carboxylic acid, perfluoroalkyl carboxylic acid, N- perfluoro octane sulfonyl disodium glutamate, etc., may be mentioned. As reactive surfactants, polyoxyethylene allylglycyl nonylphenol ether, polyoxyethylene propenyl phenyl ether, etc., may be mentioned.

The surfactants such as the above can be used alone or in combination of one or more. Among these surfactants, the nonionic surfactants having an HLB (hydrophilicity lipophile balance) balance, usually in the range of 3 to 20, is preferably used. The type of surfactant varies according to the treatment method, and nonionic surfactants which sufficiently dissolve in the solvent used are preferably selected. For example, when the metallic powders are treated in a polar organic solvents such as an aqueous solution, alcohol, ether, or acetone, hydrophilic nonionic surfactants having HLB values in the range of 10 to 20 are preferably used. When the metallic powders are treated in an organic hydrocarbon solvents such as hexane and heptane, lipophilic nonionic surfactants to some extent having HLB values generally in the range of 3 to 15 are preferably used.

Specifically, one or more types are selected from the group consisting of polyoxyethylene alkyl phenyl ethers such as nonylphenol ether, polyoxyethylene sorbitan fatty acid esters such as polyoxyethylene sorbitan monostearate, polyglycerol fatty acid esters such as polyglycerol monostearate, and sorbitan fatty esters such as sorbitan monostearate are preferably used.

Any surfactants mentioned above can be used so long as they do not interfere with the characteristics of the produced multilayer ceramic capacitors, and therefore the type of surfactant is not limited. When multilayer ceramic capacitors are produced, a metallic powder and an organic solvent are mixed, and they are subsequently heated to remove the organic component. It is preferable to use a surfactant in which the film formed on the surface of the metallic powder may be simultaneously removed with the organic component. Therefore, the surfactants preferably include no metallic component which may act as contaminants, and specifically nonionic surfactants are preferably used. The nonionic surfactants are water soluble or water-insoluble, and may be soluble in solvents such as alcohol, ether, or other hydrocarbons, but other types of surfactants may be used according to the surface treatment method.

The metallic powder of the invention is subjected to a surface treatment using the above-mentioned surfactants, and wet treatment or dry treatment is applied to the surface treatment. In consideration of treatment efficiency, wet treatment is preferable. In a wet treatment, the surfactant is dissolved in water or an organic solvent, and a metallic powder is formed into a suspension therein to perform a surface treatment. The concentration of the surfactant with respect to the solvent is normally in the range of 0.001 to 10% by weight, preferably in the range of 0.01 to 1% by weight, more preferably in the range of 0.01 to 0.5% by weight. The organic solvent is a liquid at room temperature, and as the organic solvents, for example, alcohol, ether, acetone, aliphatic hydrocarbons having a carbon number of 5 to 18; and aromatic hydrocarbons such as kerosene, light oil, toluene, and xylene; and silicone oil, etc., may be used.

The temperature of the surface treatment is not limited, but is preferably 0 to 200° C., and is more preferably 20 to 100° C. Treatment time is typically from 1 minute to 100 hours, and is preferably 1 minute to 10 hours. In the process for producing metallic powder by a vapor phase reducing method mentioned as above, the metallic powder produced is removed and recovered by separation by collection in water or oil. In this case, it is effective to add the above surfactant to water or to oil to perform the surface treatment in this process. The solvent used in oil recovery is a liquid at room temperature, and as the solvent, for example, alcohol, ether, acetone, aliphatic hydrocarbons having a carbon number of 5 to 18; and aromatic hydrocarbons such as kerosene, light oil, toluene, and xylene; and silicone oil, etc., may be used.

On the other hand, in the surface treatment by the dry method, a metallic powder is brought into contact with a surfactant using no solvent. Such methods may comprise a metallic powder and a surfactant being ground together using a ball mill, a vibration mill, a pin mill, a tower mill, a turbo mill, and a paint shaker, etc. Alternatively, a vaporized surfactant is then brought into contact with a metallic powder.

The amount of the surfactant and the percentage thereof in the surface treatment of a metallic powder is not limited, and may be the amount or percentage thereof in which a unitary film of the surfactant is formed on the surfaces of the particles of the powder. The amount of the surfactant used per 1 kg of a metallic powder is normally 0.0001 to 10 g, and is preferably 0.001 to 1 g, and is more preferably 0.01 to 0.5 g. In the surface treatment with the surfactant, it is effective for anti-agglomeration and rust resistance to add to the metallic powder a phenolic or aminic metal deactivator, typified by benzotriazole or the derivatives thereof, or well-known antioxidants. The amount of the surfactant adsorbed to the metallic powder after the surface treatment with the above surfactant is 1 to 1000 ppm per metallic particle, is preferably 1 to 500 ppm, and is more preferably 1 to 100 ppm.

In the invention, the metallic powder may be subjected to reduction processing before the surface treatment with the surfactant, and the sintering properties thereof can be further improved. The reduction processing is performed by heating the metallic powder in a reducing gas such as hydrogen. The temperature in the reduction processing is normally in the range of 100 to 500° C., and is preferably in the range of 100 to 300° C. The processing time is normally 1 minutes or more, and is preferably in the range of 1 to 60 minutes. In the process for producing metallic powder by the vapor phase reaction, excess hydrogen gas may be supplied into the reduction furnace after the metallic powder is produced in the reduction process so as to reduce the metallic powder produced. Alternatively, hydrogen gas may be supplied for cooling and reducing the metallic powder in a process for cooling the metallic powder produced. Impurities such as chloride, hydroxides, and oxides, which adhere to the surfaces of the metallic powder, are removed by the reduction processing, and the metallic powder is then treated with the surfactant. Therefore, a more effective surfactant film is formed on the surface of the metallic powder, and a metallic powder having superior sintering properties can be produced.

Among the metallic powders which were subjected to a surface treatment using a surfactant, metallic powders treated in a solvent may be dried to remove the solvent. Alternatively, the metallic powders, which were subjected to a surface treatment with a surfactant in an organic solvent, may be used for conductive pastes, without drying, while the powder is dispersed in an organic solvent, and this is also a preferred embodiment of the invention. When the metallic powder is dispersed in an organic solvent, the percentage of the organic solvent is not limited. Specifically, in consideration of operation efficiency in forming conductive pastes, the organic solvent is 0.1 to 10 parts, and preferably 0.5 to 5 parts, per 1 part of the metallic powder. That is, the dispersion of the metallic powder in the organic solvent includes not only the condition in which the metallic powder is suspended in the excess organic solvent, but also the non-suspended condition in which the organic solvent is included in the metallic powder in the above range, thereby having nearly a powdered appearance or a that of slightly moistened clay. In forming a conductive paste of a metallic powder, the metallic powder is dispersed and is kneaded with organic solvents, plasticizers, organic binders, and inorganic binders, etc. In this process, the conventional powders have inferior dispersion characteristics, so that the metallic particles agglomerate with each other. Therefore, when the metallic powder is used for electrodes of multi-layer ceramic capacitors, smooth layers cannot be formed thereby, which may result in short circuiting. As a result, thin layers cannot be formed. In contrast, the metallic powder of the invention has superior dispersion characteristics, and therefore, not only does agglomeration of the particles not significantly occur when the metallic powder is used in the non-suspended condition, but also dispersion characteristics and kneading properties in the organic solvent in forming conductive pastes are further improved by using the metallic powder as it is dispersed in the organic solvent.

When the metallic powder produced as above is used, for example, for conductive pastes, particularly for multilayer ceramic capacitors, superior sintering properties are exhibited during the production process, and superior dispersion characteristics are exhibited during the forming of conductive pastes, and therefore delamination can be prevented. Specifically, in the metallic powder of the invention, the initiation temperature for sintering is higher than that of the conventional metallic powders, and is near the initiation temperature for sintering dielectric bodies to produce multilayer ceramic capacitors. Therefore, it is difficult for delamination to occur in the metallic powder of the invention.

BEST MODE FOR CARRYING OUT THE INVENTION

Figure 1:
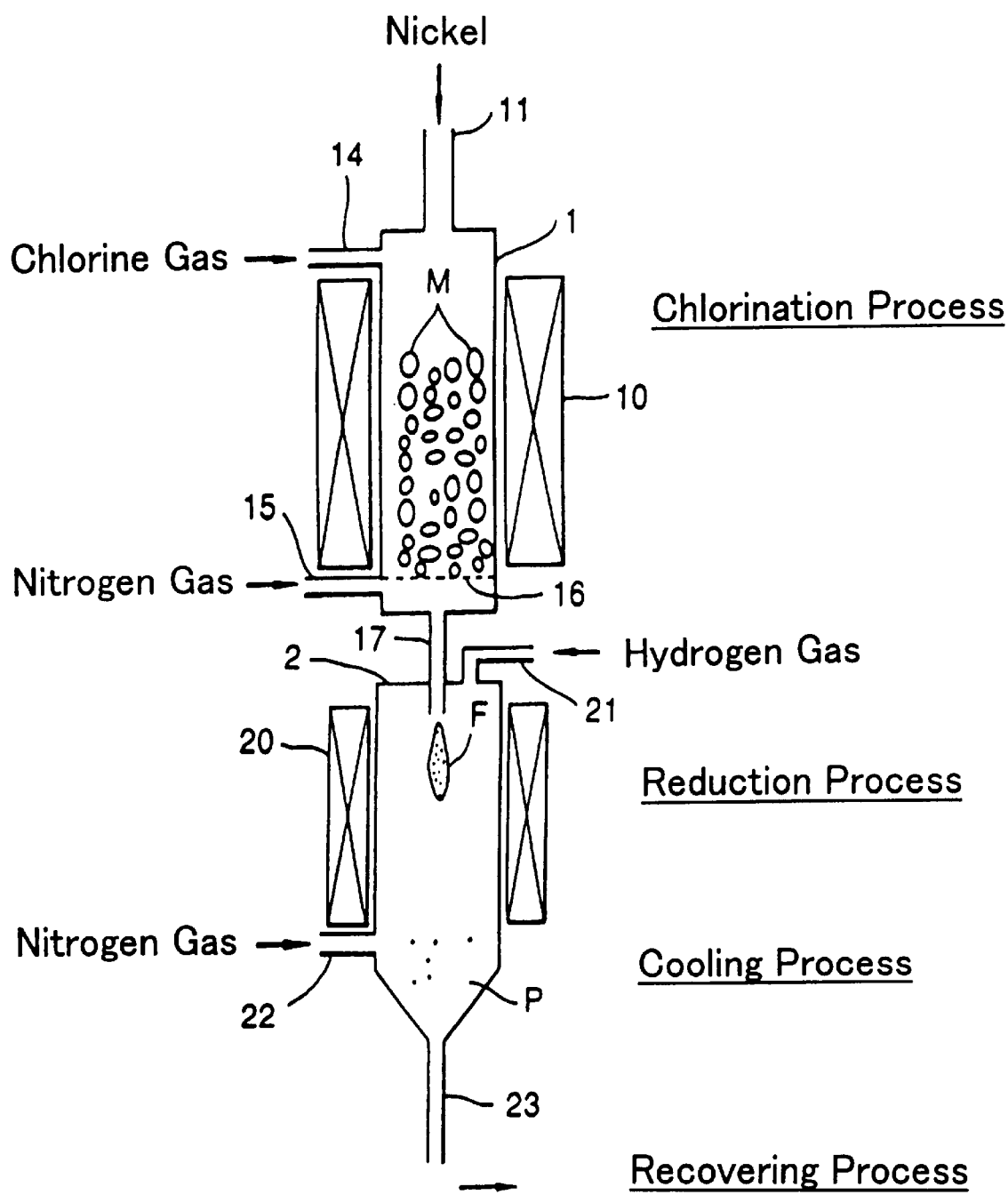
FIG. 1 is a vertical cross sectional view showing the construction of a production apparatus for a metallic nickel powder according to the present invention.

Preferred embodiments for producing a nickel powder of the present invention will be explained hereinafter with reference to the accompanying drawings, clarifying effects of the present invention. Production of Nickel Powder First, a process for producing a nickel powder by using an apparatus for producing metallic powder shown in FIG. 1 will be explained hereinafter.

As a chlorination process, 15 kg of a nickel powder having an average particle size of 5 mm as a starting raw material was charged into chlorination furnace 1 from a raw material charging tube 11 provided at the upper end of the chlorination furnace 1, and the temperature in the furnace was increased to 1100° C. Chlorine gas was introduced at a flow rate of 4 Nl/min into the chlorination furnace 1, and nickel chloride gas was generated by chlorinating the metallic nickel. The nickel chloride gas was then mixed with nitrogen gas. The nitrogen gas was supplied from an inert gas supply tube 15 provided at the lower side of the chlorination furnace 1 and at a flow rate of 10% (molar ratio) with respect to the amount of chlorine gas supplied. A net 16 is preferably provided at the bottom of the chlorination furnace 1 so as to support the raw material, nickel powder M.

Then, as a reduction process, the mixture of the nickel chloride gas and the nitrogen gas was introduced into a reduction furnace 2, from a nozzle 17 at a flow rate of 2.3 m/sec (1000° C. conversion), in which the temperature was maintained at 100° C. by a heating device 20. Simultaneously, hydrogen gas was supplied from a reducing gas supply tube 21 provided at the top of the reduction furnace 2 at a flow rate of 7 Nl/min, and the nickel chloride gas was thereby reduced. When the reducing reaction between the nickel chloride gas and the hydrogen was in progress, a flame F, such as a burning flame which would be produced by burning of a liquid fuel such as LPG and which is aimed downward, is formed at the tip of the nozzle 17.

As a cooling process after the reduction process, the nickel powder P produced by the reducing reaction was brought into contact with nitrogen gas supplied from a cooling gas supply tube 22 provided at the lower side of the reduction furnace 2, thereby cooling the nickel powder P. Then, as a recovery process, the gas mixture consisting of nitrogen gas, a vapor of hydrochloric acid, and nickel powder P was introduced into an oil scrubber from a recovery tube 23, and the nickel powder P was recovered. The recovered nickel powder P was washed using xylene, and was dried, thereby producing nickel powder. Surface Treatment by Surfactant

EXAMPLE 1

100 cc of a nonylphenol ether solution at 0.5% by weight was poured into a beaker, the nickel powder produced by the above producing method was added to the solution, and a suspension was produced. Then, the suspension solution was agitated at room temperature for 3 minutes, and the beaker with suspension solution was treated in an ultrasonic vibration bath for 1 minute. Then, the solid components were separated by screening and were dried in a vacuum at a temperature of 50° C., thereby producing the nickel powder of Example 1.

EXAMPLE 2

A nickel powder of Example 2 was produced under the same conditions as in Example 1, except that polyoxyethylene sorbitan monostearate was used instead of nonylphenol ether.

EXAMPLE 3

A nickel powder of Example 3 was produced under the same conditions as in Example 1, except that an acetone solution of polyoxyethylene sorbitan monostearate was used instead of nonylphenol ether.

EXAMPLE 4

A nickel powder of Example 4 was produced under the same conditions as in Example 1, except that an heptane solution of glycerinmonooleyl ether was used instead of nonylphenol ether.

EXAMPLE 5

10 g of the nickel powder produced by the above producing method was charged into a flask having three openings, and hydrogen gas was supplied therein. Then, the temperature of the atmosphere in the flask was inreased to 200° C., and a reduction process was performed for 5 minutes. Then, 100 cc of a heptane solution of polyoxyethylene sorbitan monostearate was added into the flask, and a suspension was produced. Then, the suspension solution was agitated at room temperature for 3 minutes, and the beaker with suspension solution was treated in an ultrasonic vibration bath for 1 minute. Then, the solid components were separated by screening and were dried in a vacuum at a temperature of 50° C., thereby producing a nickel powder of Example 5.

COMPARATIVE EXAMPLE

The nickel powder produced by the above production method was not treated with a surfactant. That is, the nickel powder as recovered was used as a comparative example.

Measurement

The nickel powders according to the above Examples and Comparative Examples were subjected to the following measurements. The results are shown in Table 1.

1) Initiation Temperature for Sintering 1 g of the nickel powder, camphor at a concentration of 3% by weight, and acetone at a concentration of 3% by weight were mixed, and the mixture was charged into a die having a diameter of 5 mm and a length of 10 mm. Then, the mixture was subjected to a surface pressure of 3 tons, whereby a test piece was produced. Initiation temperature for sintering of this test piece was measured, using a thermal expansion and contraction behavior (diratometry) measuring device (trade name: TD-5000 S, produced by Mac Science Co.), at a heating rate of 5° C./minute, in a nitrogen atmosphere.

2) Average Particle Size

The nickel powder sample was photographed using an electron microscope, 200 sizes of particles of the metallic nickel powder were measured from the photograph, and the average thereof was calculated.

3) Particle Size Distribution in Solvent

A suitable amount of the nickel powder was suspended in a terpeneol and was dispersed by ultrasonic vibration for 3 minutes. Particle sizes of the nickel powder were measured, setting the sample refractive index at 1.8, and using a laser beam scattering diffraction method particle size measuring apparatus (trade name: LS 230, produced by Coulter Co.), and the particle size distribution of the volume statistic was obtained. In Table 1, the lines indicated by "D90", "D75", "D50", "D25", and "D10" show that the particle size distributions on the lines were obtained at estimation particle sizes in 90%, 75%, 50%, 25%, and 10%, respectively. As can be seen from Table 1, the initiation temperatures for sintering of the metallic powders of the Examples are very high compared to the that of the Comparative Example. Although there is not much difference in the average particle size between the Examples and the Comparative Example, in the particle size distributions of the nickel powder in the solvent, those of the metallic powders of the Examples are narrower than that of the metallic powder of the Comparative Example. Therefore, the metallic powders of the Examples may exhibit superior sintering properties in the production of multilayer ceramic capacitors, and may exhibit superior dispersion characteristics in the forming of conductive pastes, and therefore prevention of delamination may be anticipated.

TABLE 1

|  |  | Example 1 | Example 2 | Example 3 | Example 4 | Example 5 | Comparative Example |
|---|---|---|---|---|---|---|---|
| Initiation Temperature for Sintering (° C.) | | 664 | 651 | 739 | 557 | 770 | 418 |
| Average Particle Size (µm) | | 0.49 | 0.48 | 0.49 | 0.49 | 0.48 | 0.48 |
| Particle Size Distribution (µm) | D90 | 1.48 | 1.60 | 1.50 | 1.55 | 1.45 | 2.07 |
| | D75 | 1.23 | 1.24 | 1.20 | 1.25 | 1.19 | 1.54 |
| | D50 | 0.95 | 0.89 | 0.90 | 0.94 | 0.85 | 1.15 |
| | D25 | 0.66 | 0.62 | 0.61 | 0.65 | 0.58 | 0.85 |
| | D10 | 0.41 | 0.44 | 0.43 | 0.45 | 0.40 | 0.65 |

As explained above according to the metallic powders of the invention, the initianing temperatures for sintering are high compared to those of conventional metallic powder, and are near the initiation temperatures for sintering of dielectric bodies used to produce multilayer ceramic capacitors. Therefore, the invention can yield advantages such that the metallic powder of the invention exhibits superior sintering properties in the production of multilayer ceramic capacitors, and exhibits superior dispersion characteristics in the forming of conductive pastes, and therefore delamination can be prevented.

What is claimed is:

1. A metallic nickel powder for internal electrodes in multilayer ceramic capacitors, wherein, after the metallic nickel powder is formed:

the metallic nickel powder is subjected to a reduction process in which the metallic nickel powder is heated in a reducing gas; and the metallic nickel powder is subsequently subjected to a surface treatment with a surfactant.

2. A metallic nickel powder for internal electrodes in multilayer ceramic capacitors according to claim 1, wherein the metallic nickel powder is produced by contacting a metallic nickel chloride gas and a reducing gas with each other.

3. A metallic nickel powder for internal electrodes in multilayer ceramic capacitors according to claim 1, wherein the surfactant is an nonionic surfactant.

4. A metallic nickel powder for internal electrodes in multilayer ceramic capacitors according to claim 3, wherein the nonionic surfactant is one or more nonionic surfactants selected from the group consisting of polyoxyethylene alkyl phenyl ethers, polyoxyethylene sorbitan fatty acid esters, polyglycerol fatty acid esters, and sorbitan fatty acids esters.

5. A metallic nickel powder for internal electrodes in multilayer ceramic capacitors according to claim 3, wherein the nonionic surfactant has an HLB value in the range of 3 to 20.

6. A metallic nickel powder for internal electrodes in multilayer ceramic capacitors according to claims 1, wherein the metallic nickel powder is dispersed in an organic solvent.

7. A metallic nickel powder for internal electrodes in multilayer ceramic capacitors according to claims 1, wherein the metallic nickel powder has an average particle size in the range of 0.01 to 1 µm.

8. A metallic nickel powder for internal electrodes in multilayer ceramic capacitors according to claim 1, wherein the metallic powder has a specific surface area measured by the BET method in the range of 1 to 20 $m^2/g$.

9. A metallic nickel powder for internal electrodes in multilayer ceramic capacitors according to claim 1, wherein the metallic powder has a spherical particle shape.

10. A metallic nickel powder for internal electrodes in multilayer ceramic capacitors according to claim 1, wherein the surface treatment is performed at a temperature in the range of 0 to 200° C. for 1 minute to 10 hours.

11. A metallic nickel powder for internal electrodes in multilayer ceramic capacitors according to claim 1, wherein the amount of the surfactant adsorbed to the metallic powder after the surface treatment is 1 to 1000 ppm per particle.

12. A metallic nickel powder for internal electrodes in multilayer ceramic capacitors, wherein:

the metallic nickel powder is produced by contacting a metallic nickel chloride gas and a reducing gas with each other;

than, the metallic nickel powder is subjected to a reduction process in which the metallic nickel powder is heated in a reducing gas at a temperature of from 100° C. to 500° C.;

the metallic nickel powder is subsequently subjected to a surface treatment with a surfactant; and the metallic nickel powder has an average particle size in a range of 0.01 to 1 µm.

* * * * *